United States Patent [19]

Tretter

[11] Patent Number: 4,836,097
[45] Date of Patent: Jun. 6, 1989

[54] WHIRLPOOL FOR COARSE SLUDGE SEPARATION IN BREWING OF BEER

[75] Inventor: Hans Tretter, Freising, Fed. Rep. of Germany

[73] Assignee: Anton Steinecker Maschinenfabrik GmbH, Fed. Rep. of Germany

[21] Appl. No.: 122,391

[22] Filed: Nov. 19, 1987

[30] Foreign Application Priority Data

Nov. 20, 1986 [DE] Fed. Rep. of Germany ....... 8631029

[51] Int. Cl.$^4$ ............................................... C12C 7/10
[52] U.S. Cl. ................................... 99/277.1; 426/495
[58] Field of Search .................... 99/277.1, 277.2, 275, 99/276, 277, 278; 426/495

[56] References Cited

U.S. PATENT DOCUMENTS

| 1,162,213 | 11/1915 | Bloom | 99/277.1 |
| 2,586,133 | 2/1952 | Wilken | 99/277.2 |
| 4,552,060 | 11/1985 | Redl | 426/495 |
| 4,593,611 | 6/1986 | Bruch | 99/277.1 |

Primary Examiner—Robert W. Jenkins
Attorney, Agent, or Firm—Scully, Scott, Murphy & Presser

[57] ABSTRACT

The present invention refers to a whirlpool for coarse sludge separation from the wort in brewing of beer, said whirlpool being being constructed as a circular receptacle provided with a base on which the sludge deposits and with a heating means for heating the wort.

For providing a possibility of treating the wort in a space-saving manner and without any special insulating measures in the wort heating process, the invention is characterized by the features that a rotationally symmetrical inner boiler is provided as a heating means, said inner boiler being arranged in the interior of the receptacle such that it is concentric with the longitudinal center axis of the receptacle and such that its lower side extends in spaced relationship with the base of the receptacle.

5 Claims, 1 Drawing Sheet

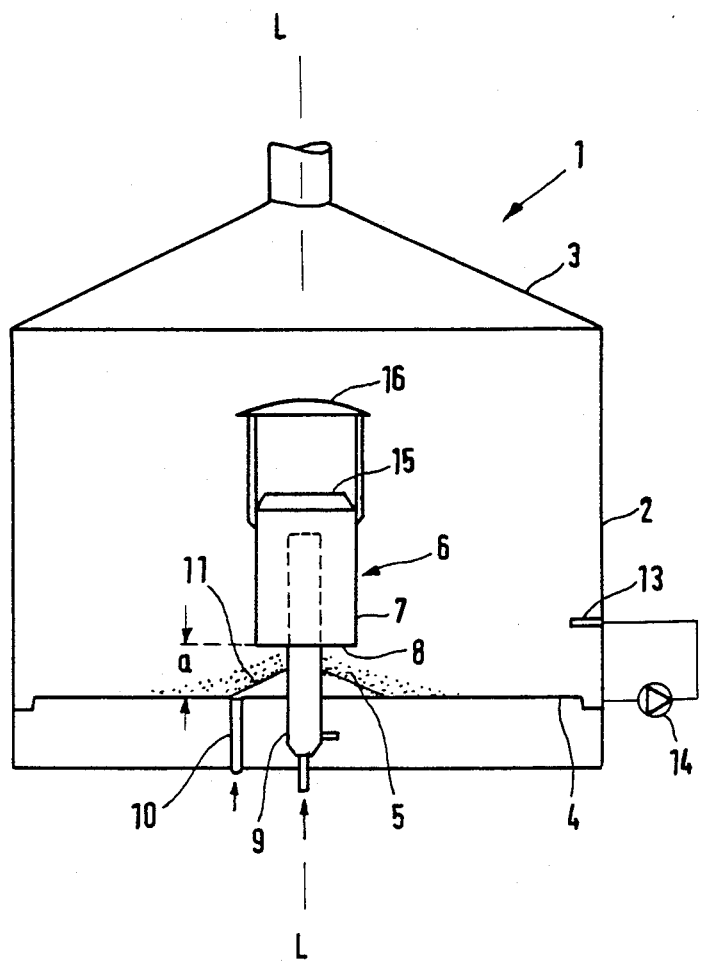

WHIRLPOOL FOR COARSE SLUDGE SEPARATION IN BREWING OF BEER

The present invention refers to a whirlpool for coarse sludge separation from the wort in brewing of beer, said whirlpool being constructed as a circular receptacle provided with a base on which the sludge deposits and with a heating means for heating the wort. Whirlpools of this type are knwon from the prior art, e.g. from German-pat. 31 32 205. They are used for the purpose of hydrodynamically separating from the wort the big protein floccules (sludge) forming in the wort after heating. This separation is effected by causing the wort to flow tangentially into the whirlpool constructed as a circular receptacle. Due to the circular flow of the wort in the receptacle, the sludge separates from the wort liquid and deposits on the base of the receptacle in the shape of a cone.

Prior to causing the circular flow of the wort in the whirlpool, the wort is heated. For this purpose, the prior art normally used known outer boilers, the wort being caused to flow through said outer boilers before it is introduced in the whirlpool and, while flowing through said outer boilers, it is heated with superheated steam.

This outer boiler represents an additional unit for which special insulation is required. Moreover, a separate pump is required for transporting the wort through the boiler.

Another possiblity which is already known is the provision of a heating means on the frame or in the area of the base of the whirlpool ladle for effecting the heating of the wort. However, these means, too, must be insulated separately, and this will also entail an increased expenditure of material and parts.

The present invention is based on the task of providing a whirlpool constructed as a circular heating receptacle in which the wort can be treated in a spacesaving manner and without any special insulating measures in the wort heating process.

For the solution of this task, the present invention suggests the features that a rotationally symmetrical inner boiler is provided as a heating means, said inner boiler being arranged in the interior of the receptacle such that it is concentric with the longitudinal center axis of the receptacle and such that its lower side extends in spaced relationship with the base of the receptacle.

On the basis of these features, the present invention suggests that an inner boiler should be arranged in the interior of the whirlpool, said inner boiler being positioned concentrically with the longitudinal center axis of the receptacle. The inner boiler is symmetrical with the whirlpool receptacle. Due to the fact that the inner boiler is arranged such that it is rotationally symmetrical and such that it extends concentrically with the longitudinal center axis, it is guaranteed that the rotational movement of the wort is not impaired when the wort circulates in the whirlpool. Hence, the inner boiler does not interfere with the circulating flow of the wort so that the separation process is not impaired by the inner boiler either. The fact that the inner boiler is arranged in a spaced mode of arrangement in such a way that its lower rim extends above the base of the receptacle guarantees that the sludge cone, which forms on the base during the circulating flow of the wort, can form such that the tip of its cone is located in the area of the longitudinal center axis. It follows that sludge separation is not impaired by this arrangement of the inner boiler either. The inner boiler does not require any special insulation because it is arranged within the whirlpool itself and because the hot wort flows around said inner boiler. Moreover, special pumps can be dispensed with, and, consequently, the power consumed by such pumps for causing flow of the wort - as in the case of external boilers - is no longer required either. Finally, the heating means of the whirlpool is accommodated within the interior of the receptacle in a spacesaving manner so that the whirlpool according to the invention also takes up less space than known means.

One embodiment of the present invention provides the feature that the inner boiler is a cylindrical inner boiler. This type of inner boiler can be cleaned easily. Another embodiment of the present invention provides the feature that the inner boiler is a cascade boiler. The desired heating of the wort can also be achieved by means of cascade boilers.

An additional embodiment of the present invention provides the feature that a steam supply tube, which extends from the base such that it is concentric with the longitudinal center axis of the receptacle, terminates in the inner boiler. The concentric arrangement of the steam supply tube also guarantees that neither the circulating flow of the wort nor the formation of the sludge cone is impaired. The steam supply tube provides the possibility of introducing the superheated steam from the base for heating the wort. Finally, the present invention suggests that the inner boiler should be provided with a nozzle at its end facing away from the base and with a deflection screen extending in spaced relationship with said nozzle. The wort is heated in the inner boiler and is forced upwards through the nozzle and against the deflection screen. The deflection screen deflects the wort essentially by 90° combining it thus with the already circulating wort liquid.

In the following, the invention will be described on the basis of the embodiment shown in the drawing.

The only FIGURE shows a schematic longitudinal section through a whirlpool according to the invention.

In said FIGURE, the whirlpool as a whole is provided with reference numeral 1. When seen in a top view, the whirlpool 1 is a circular receptacle provided with a circular cylindrical receptacle side wall 2. The receptacle is closed at the top by means of the cover 3. In the lower end of the interior of the receptacle 1 a base 4 is secured in position, and the sludge 5, which separates from the wort circulating within the receptacle, is deposited in the shape of a cone on said base. The receptacle 1 is rotationally symmetrical with regard to the longitudinal center axis L-L. In the interior of the receptacle 1, the rotationally symmetrical inner boiler 6 is arranged as a heating means. Also said inner boiler 6 is provided with a circular cylindrical outer wall 7. The lower rim 8 of the inner boiler 6 extends at a distance A above the base 4. A steam supply tube 9 extends from the base 4 into the inner boiler 6 where it terminates. Also the team supply tube is arranged such that it is concentric with the longitudinal center axis L—L of the receptacle 1.

In the area of the base 4, nozzles in the form of perforated baffle plates 11 are arranged such that they are also concentric with the longitudinal center axis L—L; a passage 10 terminates into said baffle plates. Through the passage 10, water can be flushed in, said water flowing then out of the nozzles 11 and washing the sludge 5 radially outwards into the grooves (not shown). From said grooves the sludge is then discharged in a known manner. In addition, a tangential inlet 13 is formed in the receptacle sidewall 2. Via a pump 14, the wort can be removed from the lower region and can then be caused to flow in again tangentially along the receptacle side wall through the inlet 13 so that constant circulation of the wort within the receptacle is maintained.

Towards the upper side of the receptacle 1, the inner boiler 6 ends in a nozzle 15. The wort, which has been heated in the inner boiler 6 by means of the suprheated steam flowing in through the steam supply tube 9, is directed against the deflection screen 16 via the nozzle 15 and is deflected radially outwards. Subsequently, it is recombined with the circulating stream of wort.

The inner boiler 6 can, as a concrete embodiment, consist of a cylindrical inner boiler as well as of a cascade boiler. Due to the concentric arrangmeent and the rotationally symmetrical outer surface of the inner boiler, it is achieved in both cases that the flow movement of the wort circulating in the receptacle 1 is not impaired. Since, moreover, the lower rim 8 of the inner boiler 6 extends in spaced (distance A) relationship with the base 4, th sludge cone can form, in a known manner, such that it is rotationally symmetrical wiht regard to the longitudinal center axis L—L. The height A is chosen such that normal sludge cone heights are possible. The outer wall of the inner boiler 6 need not be specially insulated because the hot wort flows round said outer wall. Also the losses within the steam supply tube are small, since the tube extends in the interior of the receptacle through which the hot wort flows.

I claim:

1. A whirlpool receptacle for coarse sludge separation from wort in brewing of beer, said whirlpool being constructed as a circular receptacle provided with a base on which sludge deposits after separation from the wort, said receptacle being further provided with a heating means for heating the wort and a tangential inlet for whirlpool circulation of the wort, characterized in that an inner boiler is provided within said circular receptacle as a heating means and is symmetrical with said circular receptacle, said inner boiler being arranged in the interior of the receptacle such that it is concentric with the longitudinal center axis of the receptacle and such that its lower side extends in spaced relationship with the base of the receptacle.

2. A whirlpool receptacle according to claim 1, characterized in that the inner boiler is a cylindrical inner boiler.

3. A whirlpool receptacle according to claim 1, characterized in that the inner boiler is a cascade boiler.

4. A whirlpool receptacle according to any one of claims 2 or 3, characterized in that a steam supply tube, which extends from the base such that it is concentric with the longitudianl center axis of the receptacle, terminates in the inner boiler.

5. A whirlpool receptacle according to claim 4, characterized in that, at its end facing away from the bottom, the inner boiler is provided with a nozzle and with a deflection screen extending in spaced relationship with said nozzle.

* * * * *